:::page-header
United States Patent Office 3,385,719
Patented May 28, 1968
:::

3,385,719
PROCESS FOR PRODUCTION OF AN ALKALI STARCH XANTHATE SOLUTION
Earl B. Lancaster, Peoria, Howard F. Conway, Pekin, and Laurence A. Weinecke and Edward L. Griffin, Jr., Peoria, Ill., assignors to the United States of America as represented by the Secretary of Agriculture
No Drawing. Filed Feb. 25, 1965, Ser. No. 435,382
5 Claims. (Cl. 106—213)

ABSTRACT OF THE DISCLOSURE

Very low viscosity aqueous 10 percent 0.15 D.S. starch xanthate solutions are directly produced without a final addition of water by stirring starch or pregelatinized starch in the form of an aqueous dispersion containing only 10 percent of starch based on the weight of the dispersion with up to 0.5 mole equivalents of NaOH and $CS_2$, preferably at or only slightly above room temperature in a closed mixer for up to 1 hour.

---

A nonexclusive, irrevocable, royalty-free license in the invention herein described, throughout the world for all purposes of the United States Government, with the power to grant sublicenses for such purposes, is hereby granted to the Government of the United States of America.

This invention relates to a one step process for preparing highly aqueous solutions or dispersions of sodium starch xanthate or of xanthated wheat flour, which highly aqueous cereal grain xanthate compositions are pourable fluids rather than doughlike plastic masses and can readily be pumped by conventional low power pumps that are useless with the prior art starch xanthates until the latter have been lowered to a solids content of about 10 percent by the addition of water.

Sodium starch xanthate per se is old. However, until very recently there have been only a few abortive attempts to provide an industrial utility for the very small amount of quasi-commercial prior art sodium starch xanthate that heretofore has been prepared in reaction mixtures comprising not over about 50 percent of water provided entirely by a strong solution of alkali in order to avoid a tacitly expected reversibly limiting aqueous hydrolysis of the desired xanthic acid esterified starch, the thusly produced prior art sodium starch xanthate compositions being extremely thick, doughlike, essentially plastic masses which, until thinned by the addition of a considerable amount of water, can be mixed and pumped only with costly especially powerful equipment requiring great amounts of power.

As taught in U.S. Patent No. 3,160,552 of Russell et al., it recently was discovered at this laboratory that very substantial proportions of xanthated starches, flours, brans, or other cereal grain materials are highly substantive to the cellulosic fibers of papermaking furnishes, to which furnishes they confer improved drainage and other properties, and that the so dispersed cereal grain xanthates can then be oxidized in situ to the crosslinked disulfurdicarbothionate (xanthide) or to the polyvalent metal dithiocarbonate by treatment with e.g., a halogen or divalent halide salt such as $ZnCl_2$ to provide paper having greatly improved wet strengths and other properties. Widespread expressions of commercial interest in the xanthate "cereal pulp" paper development have resulted in our moving it, along with the preparation of the starch xanthate, from the laboratory to the pilot plant where we have found that ordinary mixers and pumps cannot handle either the preparation or the delivery to the paper machines of the prior art less than 50 percent water content, dough-like starch xanthate compositions. In addition, we have found that the "viscose"-dictated prior art use of a large excess of alkali in order to drive the xanthation of starch in a sparingly aqueous system also produces very objectionable amounts of oxidant-binding by-products including the orange colored sodium trithiocarbonate ($Na_2CS_3$) and $Na_2S$ that competitively react with a subsequently added crosslinking agent, thereby greatly increasing both the required amount and cost of the latter.

Thus, our invention comprises the discovery that highly fluid and directly usable aqueous solutions of sodium starch xanthate having a xanthate D.S. value of about 0.036 to about 0.069, said solutions being substantially free of by-product $Na_2CS_3$ and $Na_2S$, are obtained in a low power mixer by stirring at room temperature per mole (162 g.) of unmodified or of gelatinized starch with 0.15–0.25 mole of $CS_2$ and from 0.2 to not exceeding 0.5 mole of NaOH in the presence of 9 parts by weight of water based on the combined weight of the other components of the reaction mixture, and terminating the reaction at the selected reaction time-related D.S. by discharging the xanthated starch solution containing 10 percent by weight thereof into an aqueous dispersion of cellulosic fibers.

An object of the instant invention is a process for preparing cereal grain xanthates and particularly sodium, starch xanthate having a D.S. of about 0.069 in a highly fluid and easily pumpable form. Another object is a one-step process for preparing highly fluid sodium starch xanthate solutions that are substantially free of sodium trithiocarbonate and sodium sulfide contaminants. Another object is an economical process for directly preparing dilute aqueous solutions of sodium starch xanthate batchwise or continuously for immediate addition to paper pulps. The above and related objects will be made clearer by reference to the following detailed specification and examples.

It is very well known that the formation of esters is generally severely limited by the presence of even small amounts of either exogenous water or even water of reaction. Many industrial esterification processes continuously segregate and remove water of esterification as formed. Although a modest amount of water is required for forming xanthic acid from carbon disulfide, it was indeed unobvious from the prior art that commercially practicable esterifications of the starch alcoholic hydroxyl groups by the xanthic acid would take place in a reaction mixture comprising about 90 percent of water, i.e., about nine times as much water as previously taught and used in the xanthation of starch. It was also unobvious that xanthation of the starch to any useful extent would proceed in the presence of not only a sharply lowered amount of alkali relative to the $CS_2$ but also in view of the greatly decreased absolute concentration of alkali resulting from the nine-fold increase in the proportion of water in the very highly aqueous system of our invention. In addition, our highly aqueous xanthation process and directly produced dilute starch xanthate product eliminates the power-consuming prior art steps of difficult mixing, wringing, and redissolving the thick, dough-like, plastic sodium starch xanthate in water prior to adding the resulting 10-percent solution to a cellulosic furnish.

EXAMPLE 1

Into a laboratory mixer powered by a fractional horsepower electric motor were placed 495 ml. of an aqueous dispersion containing 10 percent by weight, dry basis, of ordinary corn starch. To this were added 2 ml. of carbon disulfide and 38 ml. of 40-percent sodium hydroxide solution. Based on the starch (1 mole=162 g.), the mole equivalents of the $CS_2$ and of the NaOH were respectively 0.167 and 0.44. The closed mixer was operated for 60 minutes with brief pauses at 10 minutes and at 25 minutes for taking samples, titration analysis of which showed that 10 minutes of reaction gave a starch xanthate with a D.S. of 0.041 while 25 minutes of reaction provided a more highly substituted product having a xanthate D.S. of 0.069. The product obtained by reaction for 60 minutes had a D.S. of 0.067 which may represent either experimental variation or a very slight extent of equilibrium-based regression. The several products had essentially the same viscosity, that is, about 3720 cps. measured in a Brookfield viscometer at 25° C. and could be freely poured into a laboratory scale cellulosic pulp for making handsheets. It should be pointed out that the xanthation of starch and related cereal grain materials will not take place under the mild conditions of our process and without the formation of undesirably large amounts of the sodium trithiocarbonate and other contaminants that result from competitive reactions unless a pregelatinized and immediately soluble starch is used or unless the concentration of alkali is sufficient to cause an essentially immediate bursting and solubilization of the granules. Because even moderately elevated temperatures, e.g., about 120° F. and especially temperatures of about 160° F. markedly accelerate the formation of sodium trithiocarbonate and sodium sulfide by reaction of sodium ions with carbon disulfide, it is advisable when the starch is to be solubilized quickly in situ but in the presence of less than 0.40–0.45 mole of the alkali per mole starch, thereby requiring adjunctive heating to about 160° F., to first disperse and solubilize the starch in the absence of carbon disulfide and then cool the sodium starchate solution to not above 120° F. and even to room temperature before adding the carbon disulfide reactant.

EXAMPLE 2

In order to employ a significantly lower NaOH concentration than 0.4 mole per mole of starch, 67.8 g. (60 g. dry basis) of unmodified corn starch having a moisture content of 11.5 percent were slurried in a Waring Blendor containing 500 ml. of water at 170° F. Then 4.94 ml. of 15 N NaOH solution were added, and after about 2 minutes of mixing, 53 g. of water was added to bring the total weight of the solution to about 600 g. The resulting 10-percent starch solution containing 0.2 equivalent of NaOH per mole of starch gradually cooled to room temperature and formed a loose gel. After removing 100 g. of the gel for analytical purposes, the blender containing the remaining 500 g. of the alkali starch gel was run at low speed, and 2.8 ml. (0.15 mole/mole of starch) of carbon disulfide was introduced beneath the surface of the gel. The mixing was discontinued in less than a minute and the reaction mixture was transferred to a container that was promptly sealed with a screw cap. A starch xanthate sample removed from the container after 13 minutes of residence was found an analysis to have a xanthate D.S. of 0.049 and to contain only a trace of the by-product contaminants. The remaining starch xanthate solution having a viscosity of about 4810 cps. was successfully employed in the preparation of a subsequently crosslinked "cereal pulp."

EXAMPLE 3

Example 2 was repeated with the exception that ground whole wheat flour containing 11.5-percent moisture was substituted for the corn starch and the reaction product was analyzed after only 10 minutes of residence in the capped container. Analysis showed that the product has a xanthate D.S. of 0.036.

EXAMPLE 4

Example 1 was repeated as a continuous rather than as a batch process. Pressurized tanks containing, respectively a 10-percent aqueous dispersion of ordinary corn starch, carbon disulfide, and a 40-percent sodium hydroxide solution were connected through flowmeters to a short receiving tube that is integral with a stirrer-equipped dilatation having a capacity of 1000 ml., the dilatation being distally integral and continuous with an elongate tube that continuously discharges the resulting sodium starch xanthate solution into a cellulosic pulp. The 10-percent starch dispersion was continuously metered into the receiving tube at a predetermined rate of 495 ml. per minute thereby commingling with simultaneously admitted streams corresponding to 38 ml. per minute of 40-percent sodium hydroxide reactant and 2 ml. per minute of carbon disulfide. Following an average residence of about 2 minutes in the dilatation for dissolving the starch and initiating xanthation, the partially xanthated mixture was discharged therefrom into a polyethylene tube having sufficient length in relation to its sectional area to provide a further reaction time of about 8 minutes, said tube terminating below the surface of a cellulosic pulp. The thusly discharged sodium starch xanthate analyzed a xanthate D.S. of 0.038–0.040, and was readily crosslinked in situ by iodine or other oxidant.

We claim:
1. A process for directly preparing readily pumpable dilute starch xanthate solutions consisting of about 90 percent of water and about 10 percent by weight of a xanthated cereal grain member having a xanthate D.S. of about 0.036 to about 0.069, said cereal grain member being selected from the group consisting of the xanthates of unmodified corn starch, pregelatinized corn starch, and whole wheat flour, said solutions being characterized by Brookfield viscosities of about 3700 cps. to about 4800 cps. at 25° C., said process comprising:
  (a) adding to an approximately room temperature 10-percent aqueous dispersion of a said cereal grain material from 0.2 to not over 0.5 mole of sodium hydroxide per mole of the cereal grain material and 0.15 to 0.25 mole of carbon disulfide per mole of cereal grain material;
  (b) reacting the mixture at about room temperature for not more than about 30 minutes;
  (c) and terminating the xanthation reaction by pouring a calculated amount of reacted solution containing the desired lowly substituted cereal grain xanthate into a dilute cellulosic pulp.

2. The process of claim 1 wherein the cereal grain material is unmodified corn starch, the concentration of sodium hydroxide per mole of the starch is 0.44 mole and the concentration of carbon disulfide on the same basis is 0.167, and wherein the reaction is conducted for 30 minutes before being terminated.

3. The process of claim 1 wherein the cereal grain material is ground whole wheat flour, the concentration of sodium hydroxide per mole of the flour is 0.20 mole, the concentration of carbon disulfide on the same basis is 0.15 and wherein the reaction is conducted for 10 minutes before being terminated.

4. The process of claim 1 wherein the aqueous dispersion of cereal grain material, the sodium hydroxide, and the carbon disulfide are comingled in the form of pressurized continuous streams and wherein solubilization and xanthation of the cereal grain material are assisted by first subjecting the commingled reactants to an average of about 2 minutes of mechanical mixing and then permitting a stream of the partially reacted material to flow for about 8 additional minutes prior to terminating the reaction.

5. An aqueous solution useful as a crosslinkable wet-strength additive to papermakers cellulosic pulps, said solution being the dilute starch xanthate solution produced according to the process of claim 4 and wherein the starch xanthate has a D.S. of about 0.04.

References Cited

UNITED STATES PATENTS 3,160,552  12/1964  Russell et al. _____ 162—146

DONALD E. CZAJA, *Primary Examiner.*

R. W. MULCAHY, *Assistant Examiner.*